United States Patent
Zinnes

[11] 3,892,766
[45] July 1, 1975

[54] PROCESS FOR THE PREPARATION OF 4-KETO-1,2,3,4-TETRAHYDROCARBAZOLE

[75] Inventor: Harold Zinnes, Rockaway, N.J.

[73] Assignee: Warner-Lambert Company, Morris Plains, N.J.

[22] Filed: June 3, 1974

[21] Appl. No.: 475,476

[52] U.S. Cl. .............................................. 260/315
[51] Int. Cl. ........................................... C07d 27/68
[58] Field of Search ................................... 260/315

[56] References Cited
UNITED STATES PATENTS
3,592,824  7/1971  Schut ................................. 260/315
3,671,544  6/1972  Meltzer et al. ..................... 260/315

OTHER PUBLICATIONS
Ballantine et al., J. Chem. Soc. (1957) 2229 QD1 C6.
Clemo et al., J. Chem. Soc. (1951) 700-703 QD1 C6.

Primary Examiner—Norma S. Milestone
Assistant Examiner—S. D. Winters
Attorney, Agent, or Firm—Albert H. Graddis; Frank S. Chow

[57] ABSTRACT

An improved process for the preparation of 4-keto-1,2,3,4-tetrahydrocarbazole is disclosed. This process is as follows:

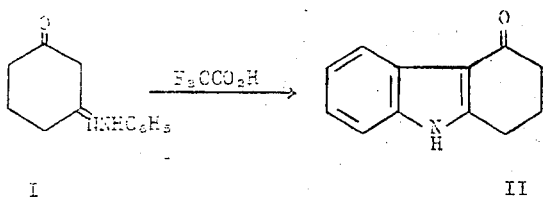

1 Claim, No Drawings

PROCESS FOR THE PREPARATION OF 4-KETO-1,2,3,4-TETRAHYDROCARBAZOLE

The present invention relates to a novel process and more particularly this invention relates to an improved process for the preparation of 4-keto-1,2,3,4-tetrahydrocarbazole.

Clemo and Felton (J. Chem. Soc. 700 (1951) have described a method for the preparation of 4-keto-1,2,3,4-tetrahydrocarbazole (II)

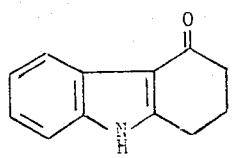

II which involves heating 1,3-Cyclohexanedione monophenylhydrazone (I)

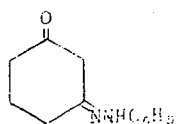

I with 40% sulfuric acid. Using the described procedure, it was found that the isolation and purification of the desired product (II) is complicated by the presence of tarry-like by-products. Thus, it is difficult to obtain satisfactory yields of pure II by this method.

The process of the present invention involves refluxing I with trifluoroacetic acid. Dilution of the reaction mixture with ice water results in precipitation of crude II which is in a much purer state than that obtained by the literature process. The crude product is collected and easily purified by recrystallization. The yields of purified II are readily reproducible and the method is convenient for large scale preparation of this compound. This reaction may be expressed by the following scheme:

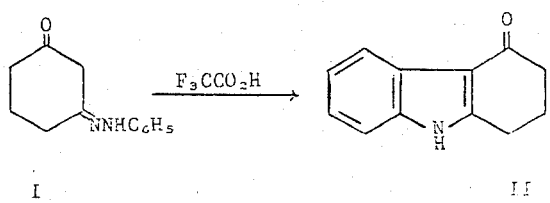

The starting material I is prepared as described by Merling (Ann. Chemie 278, 39 (1894)) and Felton and King (J. Chem. Soc. 1371 (1948)).

Compound II is useful as an intermediate for the synthesis of compounds of medicinal interest. For example, it serves as a starting material for the synthesis of azepinoindoles which are active as CNS depressants (See J. B. Hester, Jr., J. Org. Chem. 32 3804 (1967) and J. B. Hester, et al., J. Med. Chem. 11, 101 (1968)).

It is also useful as a starting material for the synthesis of 3-(morpholinomethyl)2,3-dihydrocarbazol-4(1H)-ones which are CNS depressants (R. Littel and G. R. Allen, Jr., U.S. Pat. No. 3,634,420 (Jan. 11, 1972)) and for the synthesis of indolosteroids which are useful in skin graft. See J. C. Sircar's and H. Zinnes's patent application, INDOLOSTEROIDS, filed concurrently herewith (Ser. No. 475,559).

In order to illustrate further the practice of this invention, the following examples are included.

EXAMPLE 1

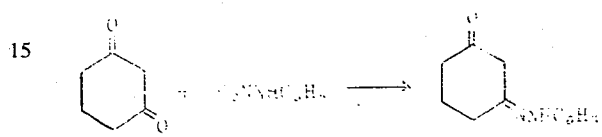

1,3-Cyclohexanedione Monophenylhydrazone. To a stirred solution of 100 g of cyclohexanedione in a mixture of 1500 ml of water and 500 ml of ethanol was added 130 g of phenylhydrazine hydrochloride. To the resulting clear solution was added a total of 72 g of sodium acetate in small portions with vigorous stirring. The mixture was allowed to stand at room temperature and the resulting precipitate was collected, washed with water-ethanol (3:1), washed wtih a small amount of absolute ethanol, and dried in vacuo at 80° for 4 hr. Yield: 147 g, mp 180°–184°.

EXAMPLE 2

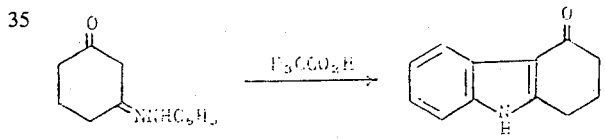

4-Keto-1,2,3,4-tetrahydrocarbazole. A solution of 60.6 g(0.3 mole) of 1,3-cyclohexanedione monophenylhydrazone in 300 ml of trifluoroacetic acid was refluxed for three hours and poured into 2 liters of ice-water. On stirring and scratching there was obtained a solid precipitate which was collected and washed with water. The precipitate was slurried with 1000 ml of dichloromethane and the resulting insoluble crystalline solid was collected. The dichloromethane filtrate was washed with water, dried over sodium sulfate and concentrated to a volume of about 100 ml. The crystals which separated were collected, combined with the material collected earlier, and recrystallized from acetonitrile. Yield after drying in vacuo at 80° was 33 g, (59%), mp 218°–220°.

I claim:

1. In an improved process for the production of a compound of the formula

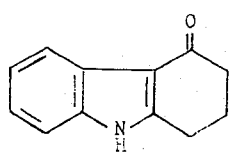

II the improvement comprises refluxing a compound of the formula
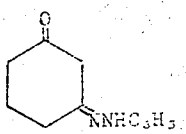
I
with trifluoroacetic acid, and diluting the reaction mixture with ice water to obtain Compound II as a precipitate.
* * * * *